April 15, 1952     D. W. FITZWATER     2,593,289
FLOATING CULTIVATOR
Filed Jan. 27, 1949
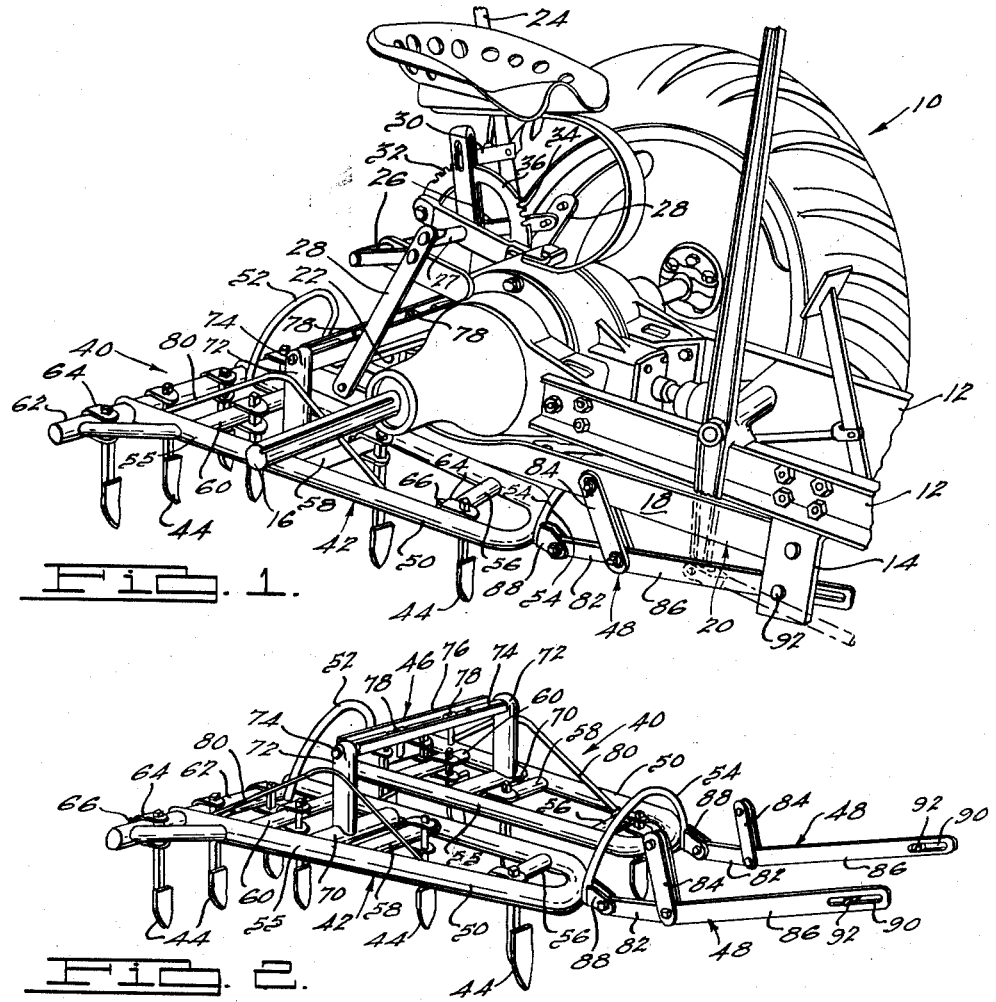
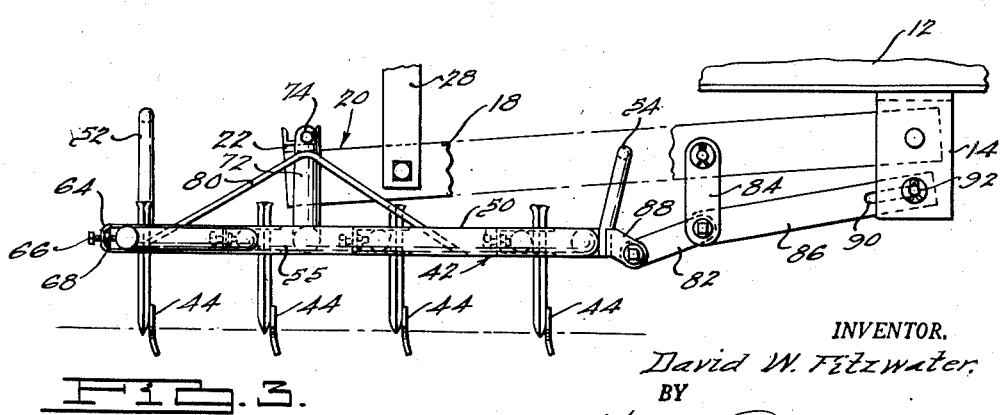
INVENTOR.
David W. Fitzwater,
BY
ATTORNEYS.

Patented Apr. 15, 1952

2,593,289

UNITED STATES PATENT OFFICE 2,593,289

FLOATING CULTIVATOR

David W. Fitzwater, Pontiac, Mich.

Application January 27, 1949, Serial No. 73,102

1 Claim. (Cl. 97—47)

The present invention relates to an improved cultivating implement.

The cultivating implement of the present invention is adapted to be mounted on and used with a conventional tractor of the type having a generally horizontally disposed drawbar pivotally connected to the tractor frame and extending rearwardly and having a transversely extending portion adapted for connection to equipment to be pulled by the tractor.

It is an object of the present invention to provide an improved cultivating implement adapted for use with such a tractor, which is adapted to be connected to the drawbar for pivotal movement relative thereto and which includes means for preventing pivotal movement of the cultivating implement beyond a desired position to prevent the earth-engaging tool or tools thereof from digging too deeply into the earth.

Another object of the invention is to provide such a cultivating implement so constructed that when attached to such a tractor, the force of gravity acting on the implement urges it toward, and tends to maintain it in, a horizontal position.

A further object of the invention is to provide an improved cultivating implement of the above-mentioned type designed to prevent the earth-engaging elements from digging too deeply into the ground when the tractor travels over irregularly surfaced ground.

Another object of the invention is to provide an improved cultivating implement for a tractor of the above-mentioned type in which the cultivating implement is adapted, when mounted on the tractor and disposed in working position, to pivotally float between predetermined limits of pivotal movement relative to the tractor.

Other and more detailed objects of the invention will be apparent from a consideration of the following specification, the accompanying drawing and the appended claim.

In the drawing:

Figure 1 is a broken view in perspective showing a cultivating implement constructed according to the present invention, mounted on a conventional tractor, the right rear wheel of which is removed, and illustrating the cultivating implement in the raised or retracted position;

Fig. 2 is a view in perspective of the cultivating implement shown in Fig. 1; and Fig. 3 is a broken view in side elevation of the cultivating implement shown in Fig. 1 showing the connecting parts of the tractor and illustrating the cultivating implement in the lowered or working position.

Referring to the drawing, the tractor generally indicated at 10 is of conventional construction and will only be described herein in such detail as is necessary to a complete understanding of the construction and operation of the applicant's improved cultivating implement. The tractor 10 illustrated in the drawing has spaced longitudinally extending frame members 12 each carrying a depending bracket 14 spaced forwardly of the rear axle 16 of the tractor, to which are pivotally connected forwardly extending arms 18 of a generally U-shaped drawbar 20. This drawbar 20 has a transversely extending portion 22 which is disposed rearwardly of the rear axle 16 and has a pair of spaced apertures (not shown) facilitating the attaching of equipment to be pulled by the tractor. The drawbar 20 may be moved between the raised and lowered positions illustrated in Figs. 1 and 3, respectively, by movement of a control lever 24 which is operatively connected to the spaced arms 18 of the drawbar 20 adjacent the transversely extending web portion 22, by lever arms 26, fixed to a horizontal lower end portion 27 of the control lever 24, and links 28 connected at their opposite ends to the drawbar arms 18 and the lever arms 26. The drawbar 20 may be locked in the raised and lowered positions by the engagement of a keeper 30 carried by the control lever 24 with teeth 32 and 34 at opposite ends of a fixed sector plate 36.

The cultivating implement 40 of the present invention comprises a generally flat implement frame generally indicated at 42, a plurality of earth-engaging elements 44 mounted on and depending from the frame 42, a supporting structure generally indicated at 46 mounted on the frame 42 adapted for connection to the drawbar 20 to support the implement frame 42 thereon for pivotal movement relative thereto, and linkage generally indicated at 48 for providing a lost motion connection between the implement frame 42 and the spaced arms 18 of the drawbar 20 to limit pivotal movement of the implement frame 42 relative to the drawbar 20 as hereinafter described.

Considering the above elements in greater detail, the implement frame 42 illustrated in the preferred embodiment shown in the drawing is adapted for cultivating the earth at opposite sides of a row of crops and comprises two similar frame sections 50 which are generally flat and are rigidly interconnected at front and rear by arched bars 52 and 54, adapted to pass over the top of the row of crops and the opposite ends of which are welded or otherwise suitably secured to the spaced frame sections 50. Each of the frame sections 50 includes a reversely turned, generally V-shaped bar 55, opening rearwardly, and a plurality of longitudinally spaced transversely extending bars 56, 58, 60 and 62 secured to the longitudinally extending bar 55 and upon which are carried the earth-engaging depending elements 44 in laterally spaced relation. The adjacent legs of the two frame sections 50 are disposed in generally parallel relation.

It will be appreciated that in the broader aspects of the invention the earth-engaging elements 44 carried by the implement frame 42 may be of any desired form and number. In the preferred embodiment illustrated the work-engaging elements 44 are generally shovel-shaped and each of the spaced frame sections 50 carries six of these shovels. The preferred cultivating implement illustrated in the drawing is adapted for use with a low horsepower light garden tractor and, accordingly, the shovels 44 may be rigidly mounted on the implement frame by the saddles 64 which are secured to the cross bars 56, 58, 60 and 62 by screws 66 threaded through nuts 68 welded or otherwise secured to the saddles 64, and engaging the cross bars 56, 58, 60 or 62. The various parts of the cultivating implement illustrated are so constructed that upon engagement of one of the shovel elements 44 with an obstruction the forward movement of a lightweight garden tractor would be stopped before the implement would be broken.

Each of the frame sections 50 is also provided with an additional transversely extending bar 70 carrying an upright 72 in the upper ends of which are journaled trunnions 74 welded or otherwise suitably secured to and extending from opposite ends of a transversely extending channel member 76. The channel 76 is adapted to be secured to the transversely extending portion 22 of the drawbar 20 by bolts 78. Reinforcing bars 80 are welded or otherwise suitably secured to the frame sections 50 and the upright 72 to afford additional support for the latter. The transversely extending bars 70 are disposed longitudinally of the frame sections 50 to be substantially at the center of gravity thereof so that when the implement 40 is supported on the channel member 76, the force of gravity acts to urge the implement frame 42 toward and maintain it in a horizontal position.

Referring now to the linkage 48 it will be appreciated from a complete understanding of the present invention that in the broader aspects thereof, any suitable lost motion connection between the drawbar 20 and the implement 42 may be employed so long as that connection is effective to permit the desired pivotal movement between the implement frame 42 and the drawbar 20, and which is effective during use of the implement to prevent pivotal movement of the implement beyond a desired limit. It will be appreciated that the above mentioned desired pivotal movement of the implement frame 42 relative to the drawbar 20 is necessary upon pivotal movement of the drawbar 20 from the lowered position illustrated in Fig. 3 to the raised position illustrated in Fig. 1, if in the raised position the implement frame 42 is to be horizontally disposed as required to afford equal and maximum clearance between all of the shovels 44 and a road bed over which the implement is transported. Also, during use of the implement 40 it is necessary that pivotal movement of the implement frame 42 relative to the drawbar 20 be limited to prevent the force exerted by the earth upon the shovels 44 from pivoting the implement frame 42 clockwise about the trunnions 74 as viewed in Figs. 1, 2 and 3. Such movement would cause the forward shovels 44 to dig too deeply into the ground and if there were no limit to such pivotal movement, it would continue until the tractor wheels were raised off the ground or the implement frame 42 were pivoted through an angle of substantially 90° and the implement 40 rendered entirely ineffective.

In the preferred embodiment illustrated in the drawing, the linkage 48 comprises three links 82, 84 and 86 pivotally interconnected at one end. The other ends of the links 82 are pivotally connected to brackets 88 welded or otherwise suitably secured to the front ends of the frame sections 50. The other ends of the links 84 are pivotally connected to the arms 18 of the drawbar 20 at a point adjacent the forward end of the frame sections 50, and the opposite ends of the links 86 are provided with elongated slots 90 adapted to permit a pivotal and lost motion connection of the links 86 to the brackets 14 on the tractor frame 12 by pivot pins 92. From an examination of Fig. 3, which illustrates the position of the cultivating implement during use, it will be appreciated that the engagement of the pivot pin 92 with the outer end of the slot 90 prevents further downward pivotal movement of the forward end of the frame 42, or, in other words, pivotal movement in a direction to permit the forward shovel elements 44 to dig deeper into the earth. In the preferred embodiment illustrated in the drawing, the limit of such pivotal movement is reached when the frame 42 is parallel to a plane tangent to the lower edges of the front and rear wheels of the tractor, or in the case of level ground, when the frame 42 is horizontal. It will also be appreciated that during movement of the draw-bar 20 from the lowered position illustrated in Fig. 3 to the raised position illustrated in Fig. 1, this linkage construction permits the implement frame 42 to pivot about the trunnions 74 under the action of the force of gravity as above described to at all times remain in a substantially horizontal position.

It will be noted that in the construction of the present invention the forward shovel element 44 carried by the implement frame 42 is disposed in the vicinity of the rear axle 16 of the tractor. Because of this arrangement, as the tractor travels over a ridge or other raised portion of ground the leading shovel elements 44 are raised to prevent their digging too deeply into the earth. This constitutes an important advantage over implements of the type dragged at a distance behind the tractor in which excessive digging of the implement into the ground is common.

Although the cultivating implement of the present invention has been illustrated herein in connection with the cultivating of horizontal, or level ground it will be readily appreciated that it is equally effective for working slopes because the combined effect of the action of the earth on the shovels 44 and action of the linkage 48 will cause the frame 42 to assume a position parallel to the plane tangent to the lower edges of the tractor wheels, or the plane of the slope upon which it is travelling.

While only one specific embodiment of the invention has been illustrated and described in detail, it will be readily appreciated by those skilled in the art that numerous modifications and changes may be made without departing from the spirit of the present invention.

What is claimed is:

A cultivating implement for a tractor having a frame, front and rear axles mounted on said frame, spaced rear wheels mounted on the rear axle, a generally U-shaped draw bar having spaced arms extending forwardly and pivotally connected to brackets depending from the tractor frame forwardly of said rear axle and having a web portion which extends transversely of the tractor rearwardly of said rear axle and is adapted to be connected to equipment to be pulled by said tractor, and means for pivoting said draw bar between and releasably locking it in lowered and raised positions, said implement comprising an implement frame adapted to extend under said axle and between said wheels, a plurality of earth working elements mounted on said frame, a pair of laterally spaced uprights mounted on said implement frame, a supporting member extending transversely of said implement frame and pivotally connected to said uprights, said supporting member being adapted to be secured to said web portion of said draw bar, said uprights being so disposed longitudinally of said implement that said supporting member extends substantially over the center of gravity of said implement when the implement frame is horizontally disposed whereby the force of gravity acting on said implement when the latter is supported on said member urges the implement toward and tends to maintain it in a horizontal position, and a pair of link means connected to the front end of said implement frame and adapted to be connected to said tractor and to be operative, when said implement is mounted on said tractor and said draw bar is in its lowered position, to prevent pivotal movement of said implement, in a direction to lower the forward portion of the implement, beyond a predetermined limiting position relative to said tractor, each of said link means comprising first, second and third links pivotally interconnected at one end, said first links having their other ends pivotally connected to the front ends of the implement frames, said second links having their other ends adapted to be pivotally connected to said draw bar adjacent the front end of said implement frame, and the other ends of said third links having a slot adapted to permit a pivotal and lost motion connection to said tractor for limiting the relative pivotal movement of said first and second links.

DAVID W. FITZWATER.

REFERENCES CITED

The following references are of record in the file of this patent:

UNITED STATES PATENTS

| Number | Name | Date |
| --- | --- | --- |
| 99,719 | Shirk et al. | Feb. 8, 1870 |
| 213,614 | Black et al. | Mar. 25, 1879 |
| 1,630,576 | Monson | May 31, 1927 |
| 2,005,568 | Smith | June 18, 1935 |
| 2,011,687 | Millican | Aug. 20, 1935 |
| 2,233,011 | Hinds et al. | Feb. 25, 1941 |
| 2,274,769 | Zink et al. | Mar. 3, 1942 |
| 2,341,807 | Olmstead et al. | Feb. 15, 1944 |
| 2,483,565 | Strandlund | Oct. 4, 1949 |

FOREIGN PATENTS

| Number | Country | Date |
| --- | --- | --- |
| 318,751 | Germany | Feb. 6, 1920 |